US009663967B2

(12) United States Patent
Salter et al.

(10) Patent No.: US 9,663,967 B2
(45) Date of Patent: May 30, 2017

(54) ILLUMINATED LATCH SYSTEM

(71) Applicant: Ford Global Technologies, LLC, Dearborn, MI (US)

(72) Inventors: Stuart C. Salter, White Lake, MI (US); Annette Lynn Huebner, White Lake, MI (US); Cornel Lewis Gardner, Romulus, MI (US); Kristin Ann Hellman, Walled Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/172,489

(22) Filed: Jun. 3, 2016

(65) Prior Publication Data
US 2017/0072848 A1  Mar. 16, 2017

Related U.S. Application Data

(60) Provisional application No. 62/217,249, filed on Sep. 11, 2015.

(51) Int. Cl.
*B60Q 1/00* (2006.01)
*B60Q 1/26* (2006.01)
*B60Q 11/00* (2006.01)
*E05B 17/10* (2006.01)
*B60Q 3/30* (2017.01)
*B60Q 3/06* (2006.01)
*F21V 8/00* (2006.01)

(52) U.S. Cl.
CPC .............. *E05B 17/10* (2013.01); *B60Q 3/06* (2013.01); *B60Q 3/30* (2017.02); *G02B 6/0003* (2013.01); *G02B 6/0096* (2013.01)

(58) Field of Classification Search
CPC ......... B60Q 3/30; E05B 17/10; E05B 17/106; G02B 6/0003; G02B 6/0096
USPC .......................... 362/487–488, 496, 509–511
See application file for complete search history.

(56) References Cited

U.S. PATENT DOCUMENTS

| 5,053,930 | A | 10/1991 | Benavides |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |
| 6,135,514 | A | 10/2000 | Kowalewski et al. |
| 6,209,933 | B1 | 4/2001 | Ang et al. |

(Continued)

FOREIGN PATENT DOCUMENTS

| CN | 101337492 A | 1/2009 |
| CN | 201169230 Y | 2/2009 |

(Continued)

*Primary Examiner* — Jason Moon Han
(74) *Attorney, Agent, or Firm* — Jason Rogers; Price Heneveld LLP

(57) ABSTRACT

An illuminated latch system for a vehicle is disclosed herein. The illuminated latch system includes an engine compartment having a latch configured to open the compartment. A light source is configured to emit light at a first wavelength and is disposed between the compartment and latch. A light guide is optically coupled to the light source and configured to direct light towards the latch and the compartment. A first photoluminescent structure is disposed within the light guide and configured to luminesce in response to excitation by the light source. A second photoluminescent structure is disposed within the compartment that luminesces in response to the light at the first wavelength.

20 Claims, 15 Drawing Sheets

(56) References Cited

U.S. PATENT DOCUMENTS

| | | |
|---|---|---|
| 6,369,395 B1 | 4/2002 | Roessler |
| 6,390,529 B1 | 5/2002 | Bingle et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,350,949 B2 | 4/2008 | Meinke et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2006/0226962 A1 | 10/2006 | Cheng |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0155709 A1 | 6/2013 | Kim et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0236613 A1 | 8/2016 | Trier |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |

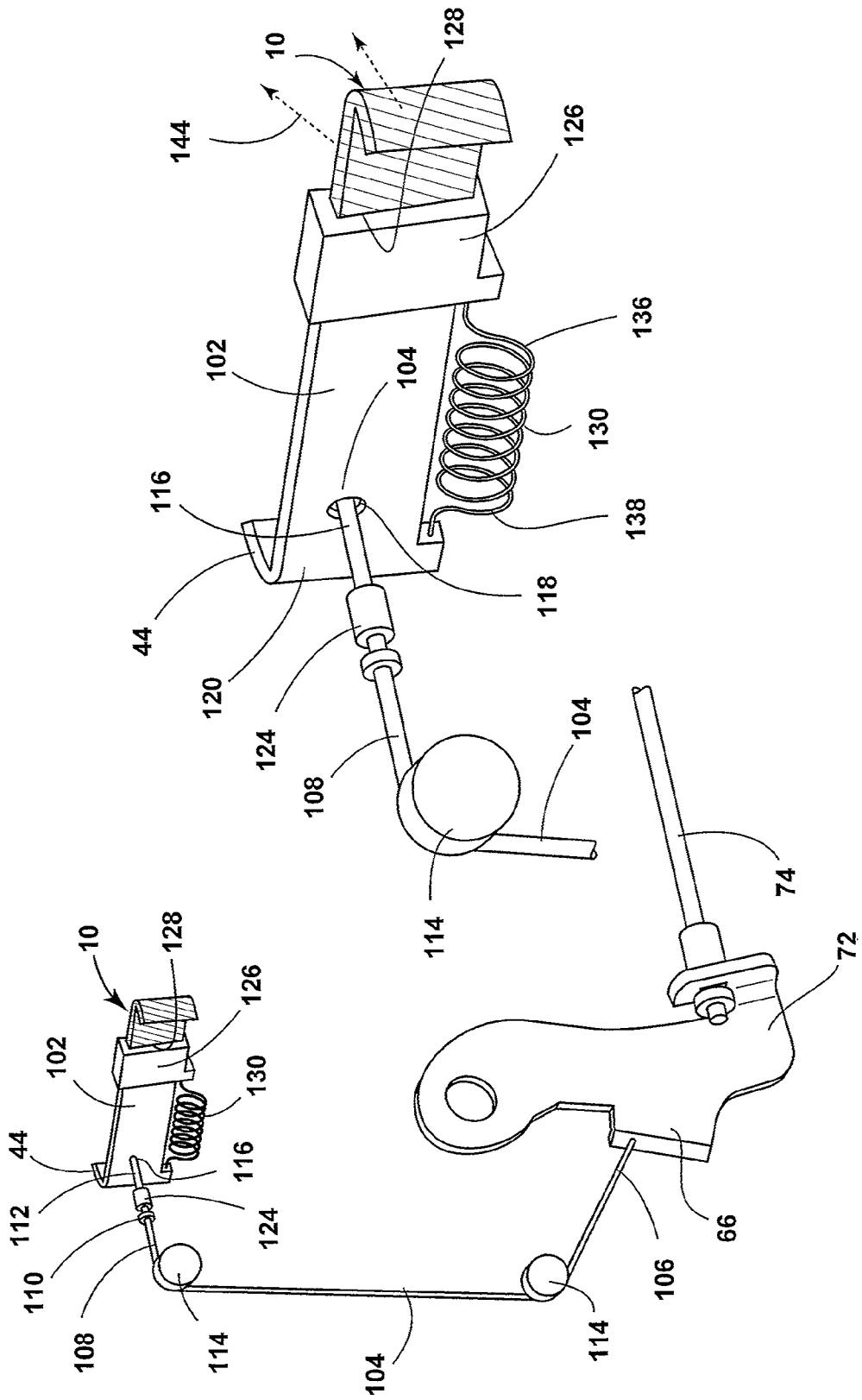

ILLUMINATED LATCH SYSTEM

CROSS-REFERENCE TO RELATED APPLICATION

This application claims benefit from U.S. Provisional Patent Application No. 62/217,249, which was filed on Sep. 11, 2015, entitled "ILLUMINATED LATCH SYSTEM," the entire disclosure of which is hereby incorporated herein by reference.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present disclosure, a vehicle is disclosed. The vehicle includes an engine compartment having a latch configured to open the compartment. A light source is configured to emit light at a first wavelength and is disposed between the compartment and the latch. A light guide is optically coupled to the light source and is configured to direct light towards the latch and the compartment. A first photoluminescent structure is disposed within the light guide and a second photoluminescent structure is disposed within the compartment. Each photoluminescent structure is configured to luminesce in response to excitation by the light source.

According to another aspect of the present disclosure, an illuminated latch system for a vehicle is disclosed. The illuminated latch system includes a light source attached to a component proximate an engine compartment that is optically coupled to a light guide. The light guide is configured to transmit inputted light from the light source. A first photoluminescent structure is configured to emit outputted light in response to light emitted from the light source. The light guide directs light towards the first photoluminescent structure.

According to yet another aspect of the present disclosure, an illuminated latch system for a vehicle is disclosed. The illuminated latch system includes a light source. A light pipe is operably coupled with the light source. A first photoluminescent structure is disposed within the light pipe. Inputted light emitted from the light source is converted to a second wavelength within the light pipe and directed towards a feature on a vehicle.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 10 is a front perspective view of the secondary latch release handle arm and retainer with the secondary latch release handle arm in the retracted position;

FIG. 11 is an enlarged front perspective view of the secondary latch release handle arm and retainer with the secondary latch release handle arm in the retracted position;

DETAILED DESCRIPTION OF THE PREFERRED EMBODIMENTS

Figure 2:
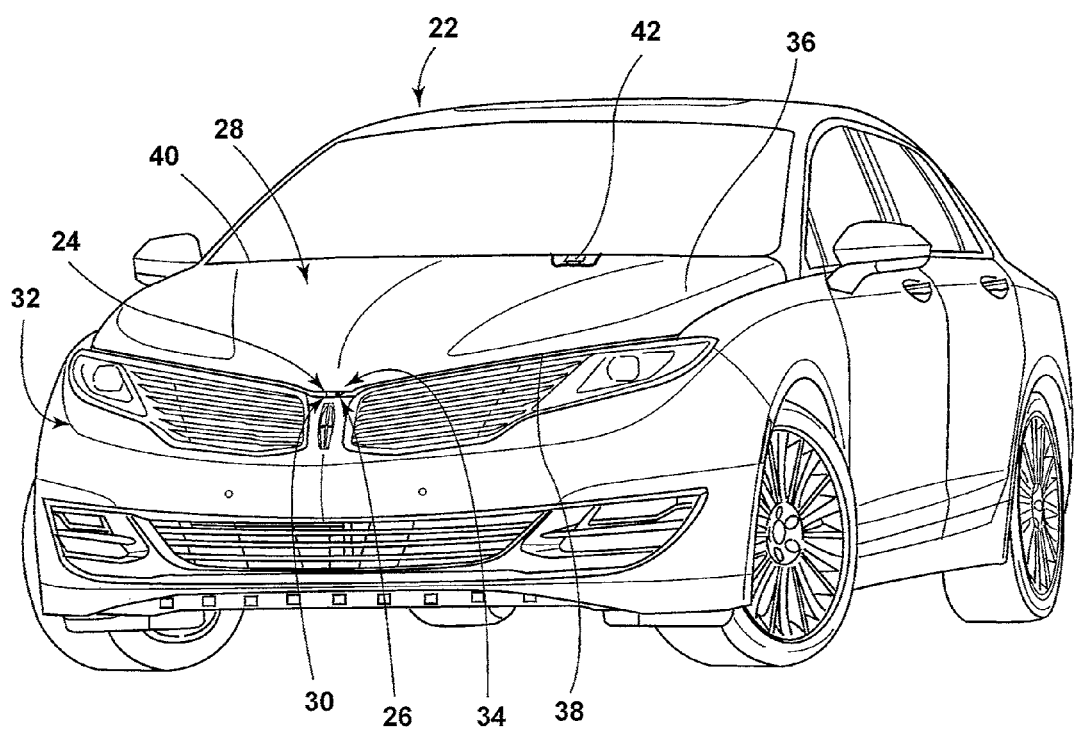
FIG. 2 is a front side perspective view of a motor vehicle incorporating an illuminated latch system, according to one embodiment.
Figure 3:
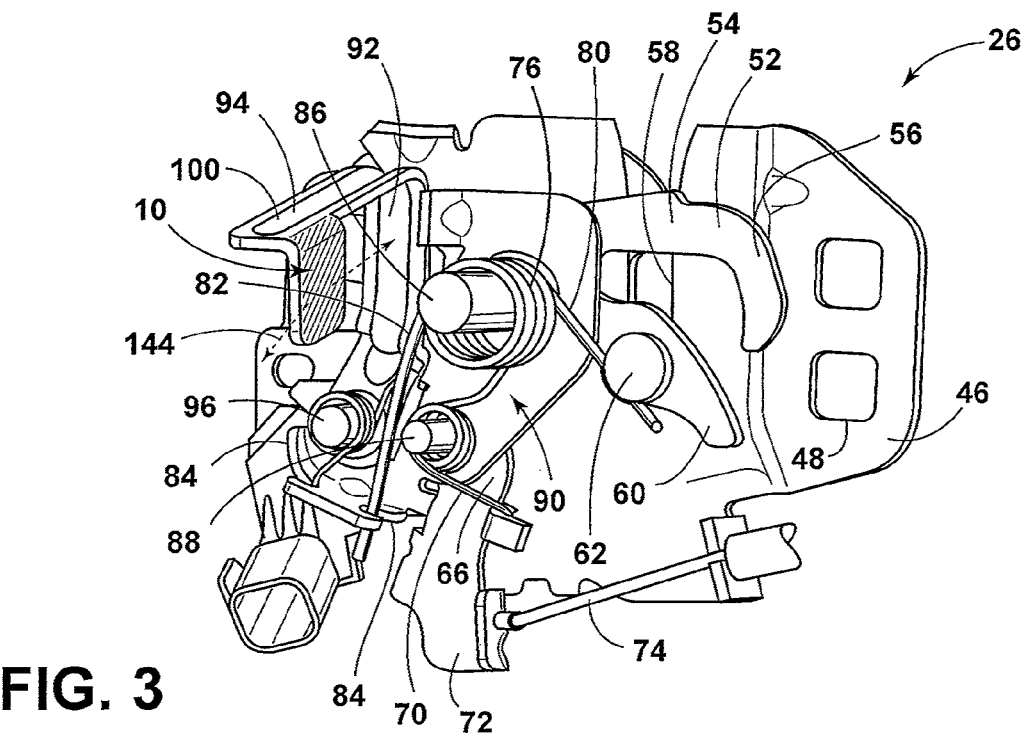
FIG. 3 is a front side perspective view of the illuminated latch with the latch placed in the locked position.
Figure 4:
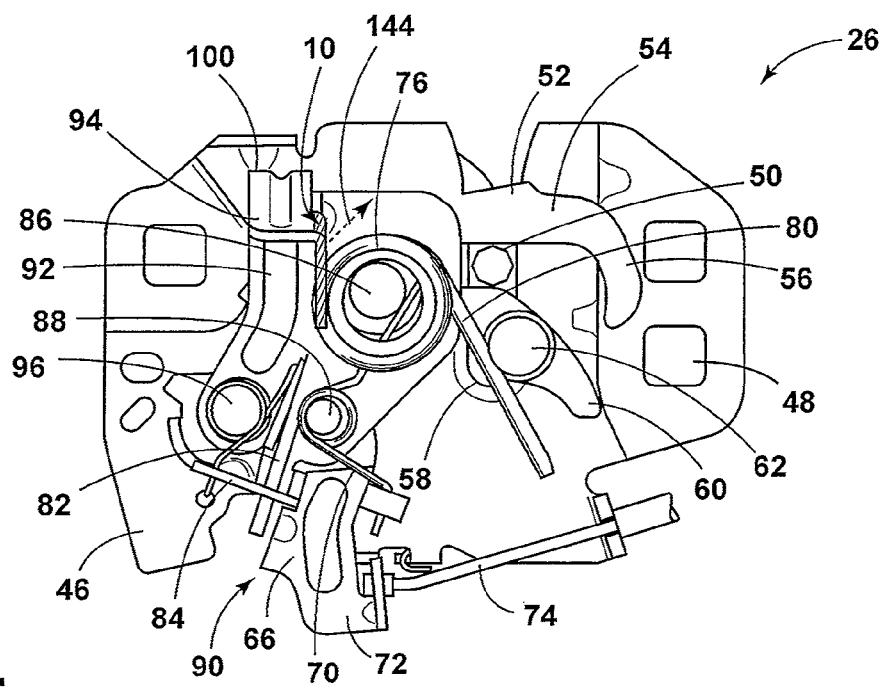
FIG. 4 is a front plan view of the illuminated latch with the latch placed in the locked position.
Figure 5:
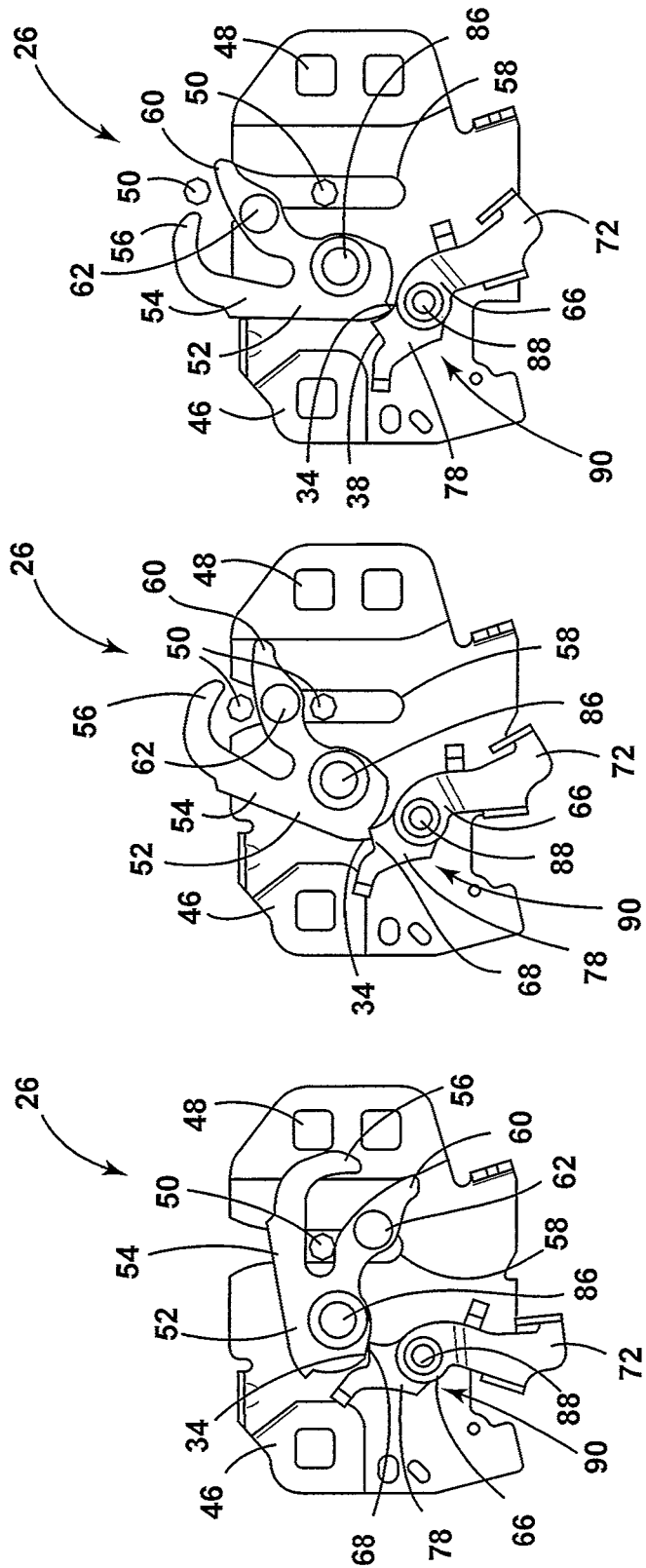
FIG. 5A is a front plan view of the hood latch in the locked position employing the illuminated latch system, according to one embodiment.
FIG. 5B is a front plan view of the hood latch in the released and partially open position employing the illuminated latch system, according to one embodiment.
FIG. 5C is a front plan view of the illuminated latch in the open position according to one embodiment of the present invention.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated latch system configured as an illuminated latch for a vehicle that is configured to illuminate a portion thereof. The illuminated latch system may advantageously employ one or more photoluminescent structures that are configured to illuminate in response to pre-defined events. The one or more photoluminescent structures may be configured to convert light received from an associated light source and re-emit the light at a different wavelength typically found in the visible spectrum.

Figure 1A:
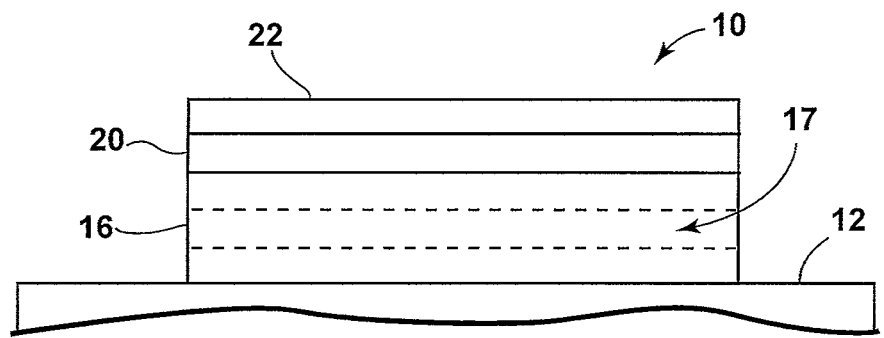
FIG. 1A is a side view of a photoluminescent structure rendered as a coating for use in a photoluminescent latch assembly according to one embodiment.
Figure 1B:
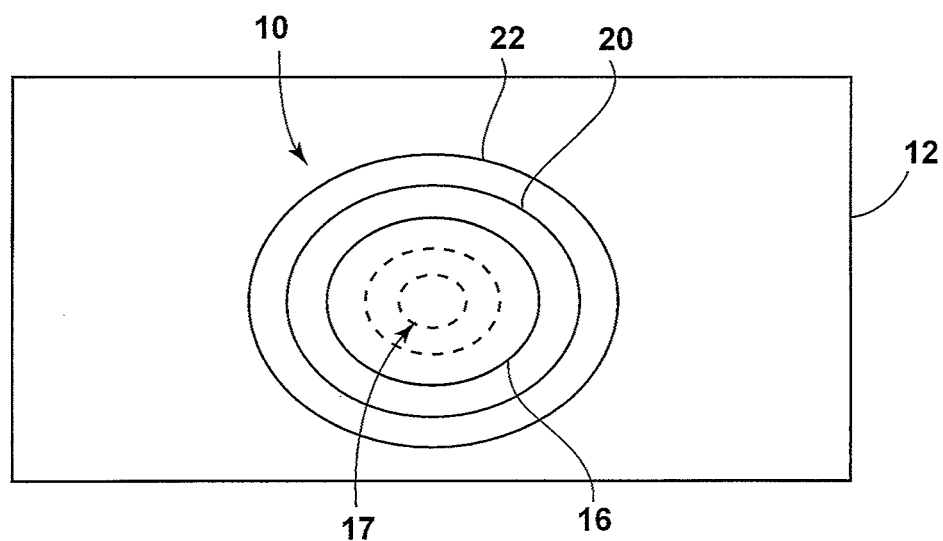
FIG. 1B is a top view of a photoluminescent structure rendered as a discrete particle according to one embodiment.
Figure 1C:
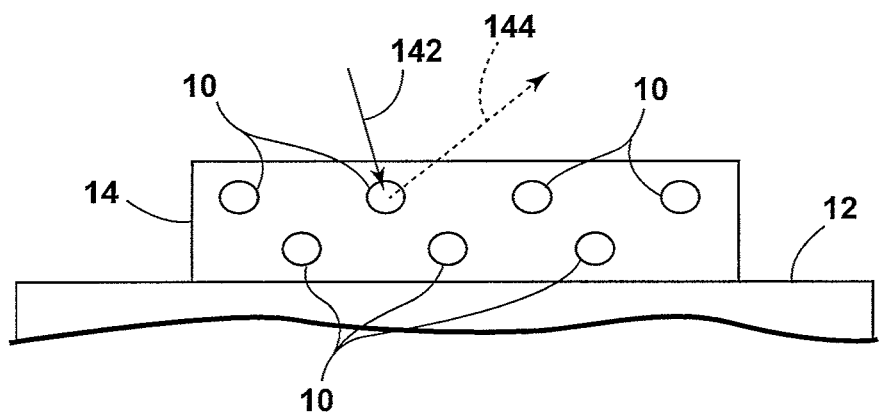
FIG. 1C is a side view a plurality photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 17 may become excited upon receiving an inputted light 142 of a specific wavelength, thereby causing the light to undergo a conversion process. Under the principle of down conversion, the inputted light 142 is converted into a longer wavelength, outputted light 144 that is outputted from the photoluminescent structure 10. Conversely, under the principle of up conversion, the inputted light 142 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 30 (FIG. 2) is referred to herein as inputted light 142 and is illustrated herein as solid arrows. In contrast, light emitted from the photoluminescent structure 10 is referred to herein as outputted light 144 and is illustrated herein as broken arrows. The mixture of inputted light 142 and outputted light 144 that may be emitted simultaneously is referred to herein as outputted light.

The energy conversion layer 16 may be prepared by dispersing the photoluminescent material 17 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 17 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the outputted light 144 that has been down converted or up converted may be used to excite other photoluminescent material(s) 18 found in the energy conversion layer 16. The process of using the outputted light 144 outputted from one photoluminescent material 17 to excite another, and so on, is generally known as an energy cascade and may serve as an alternative for achieving various color expressions. With respect to either conversion principle, the difference in wavelength between the inputted light 142 and the outputted light 144 is known as the Stokes shift and serves as the principle driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 17 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 17 may include organic or inorganic fluorescent dyes including rylenes, xanthenes, porphyrins, and phthalocyanines. Additionally, or alternatively, the photoluminescent material 17 may include phosphors from the group of Ce-doped garnets such as YAG:Ce and may be a short persistence photoluminescent material 17. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the inputted light 142 and the moment when the light intensity of the outputted light 144 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 17 with ultra-short persistence characteristics, which can emit the outputted light 144 by absorbing purple to blue inputted light 142 emitted from a light source 36. According to one embodiment, a ZnS:Ag phosphor may be used to create a blue outputted light 144. A ZnS:Cu phosphor may be utilized to create a yellowish-green outputted light 144. A $Y_2O_2S$:Eu phosphor may be used to create red outputted light 144. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 17, according to one embodiment, disposed within the photoluminescent structure 10 may include a long persistence photoluminescent material 17 that emits the outputted light 144, once charged by the inputted light 142. The inputted light 142 may be emitted from any excitation source (e.g., any natural light source, such as the sun, and/or any artificial light source 36). The long persistence photoluminescent material 17 may be defined as having a long decay time due to its ability to store the inputted light 142 and release the outputted light 144 gradually, for a period of several minutes or hours, once the inputted light 142 is no longer present.

The long persistence photoluminescent material 17, according to one embodiment, may be operable to emit light at or above an intensity of 0.32 mcd/m² after a period of 10 minutes. Additionally, the long persistence photoluminescent material 17 may be operable to emit light above or at an intensity of 0.32 mcd/m² after a period of 30 minutes and, in some embodiments, for a period substantially longer than 60 minutes (e.g., the period may extend 24 hours or longer, and in some instances, the period may extend 48 hours). Accordingly, the long persistence photoluminescent material 17 may continually illuminate in response to excitation from any light sources 36 that emits the inputted light 142, including, but not limited to, natural light sources (e.g., the sun) and/or any artificial light source 36. The periodic absorption of the inputted light 142 from any excitation source may provide for a substantially sustained charge of the long persistence photoluminescent material 17 to provide for consistent passive illumination. In some embodiments, a light sensor may monitor the illumination intensity of the photoluminescent structure 10 and actuate an excitation source when the illumination intensity falls below 0.32 mcd/m², or any other predefined intensity level.

The long persistence photoluminescent material 17 may correspond to alkaline earth aluminates and silicates, for example doped di-silicates, or any other compound that is capable of emitting light for a period of time once the inputted light 142 is no longer present. The long persistence photoluminescent material 17 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the inputted light 142 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the inputted light 142 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Referring to FIG. 2, a perspective view of a vehicle 22 is shown demonstrating an illuminated latch system 24 configured to illuminate a portion of a latch assembly 26 and/or vehicle engine compartment 28. The illuminated latch system 24 may include a light source 30 disposed on a front portion 32 of the vehicle 22 and a photoluminescent structure 10.

The vehicle 22 includes a hood 36 covering an engine compartment 28. The hood 36 is generally formed as a panel having a forward edge 38 and a rearward edge 40. The hood 36 may be connected to the body of the motor vehicle 22 by hinges 42. The hood 36 is releasably connected to the motor vehicle 22 through a hood latch assembly 26 and is pivotable relative to the motor vehicle 22 to move between an open position and a closed position. In the described example, the hood latch assembly 26 is located adjacent the forward edge 38 of the hood and the hinges 42 may be located at the rearward edge 40 of hood 36. In exemplary embodiments, the closure may refer at least one of a vehicle hood 36 configured to enclose an engine compartment 28, a deck lid, and/or a trunk lid configured to enclose a cargo compartment. In alternate embodiments, the closure may correspond to a hatch or door of a vehicle 22.

Referring now to FIGS. 3-10, the latch assembly 26 is shown according to multiple embodiments. The hood latch assembly 26 includes a latch mounting bracket 46 attached via mounting holes 48 to a front chassis member or base via fasteners (not shown). The latch assembly 26 interacts with a striker 50 disposed on the forward edge 38 of the hood 36 relative to the motor vehicle 22. The hood 36 has a closed locked position, a released position, and an open position. In the closed locked position, seen in FIG. 5A, the hood 36 cannot be raised and is restrained in place by a latch 52 capturing and restraining the striker 50. The latch 52 has a primary latch portion 54 extending transversely and a secondary latch portion 56 depending from the primary latch portion 54 and normal to the primary latch portion 54 and extending in a downward direction to create a hook-shaped structure, as shown. In the released position, as shown in FIG. 5B, the primary latch 54 is released but the secondary latch portion 56 is not, thereby allowing the hood 36 to be raised, for example, 35 to 40 mm. In the open position, as shown in FIG. 5C, both the primary and the secondary latch portions 54, 56 are in the open position, and the hood 36 may be raised as described previously. The primary latch portion 54 restrains the hood 36 in the closed locked position within a channel 58 configured to receive the striker. The latch 52 also includes a lower portion 60 to which a latch engagement stud 62 is attached.

Figure 6:
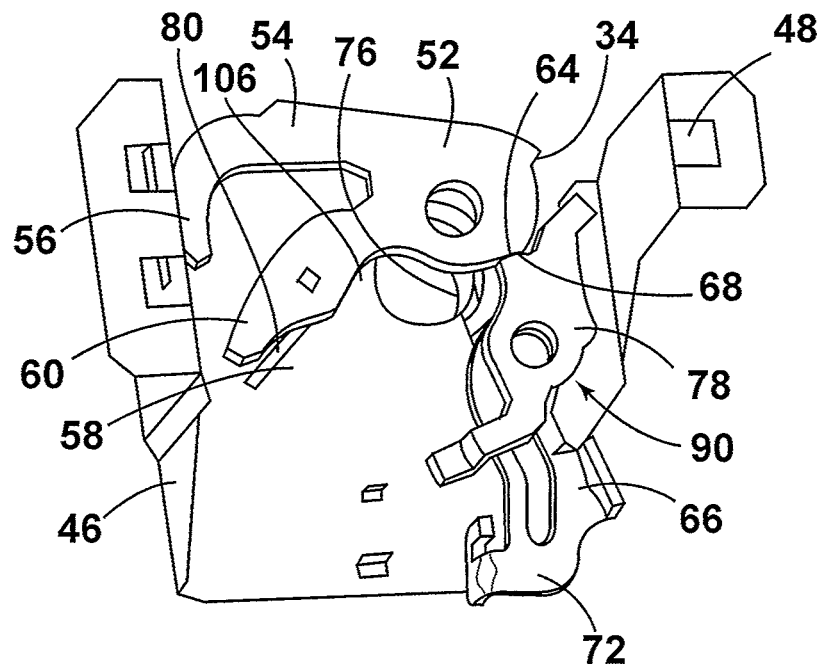
FIG. 6 is a rear perspective view of the pawl release lever of the illuminated latch in the locked position employing the illuminated latch system, according to one embodiment.
Figure 7:
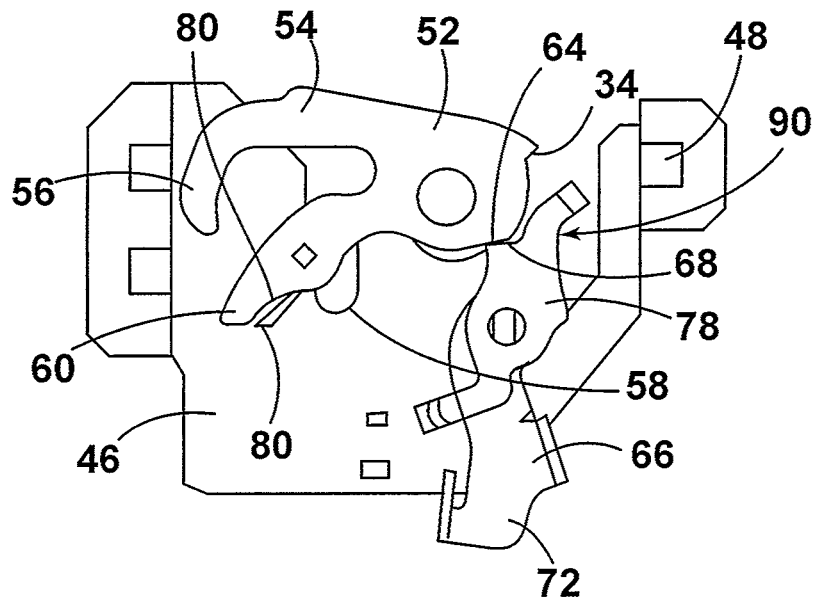
FIG. 7 is a rear plan view of the pawl release lever of the illuminated latch in the locked position according to one embodiment of the present invention.

The latch 52 further includes a pawl engaging primary latch tab 64 and secondary latch tab 34 adapted for interaction with a release mechanism 90 including a release pawl 78 pivotally mounted to the bracket 46 to receive and engage the primary latch tab 64, as shown in FIGS. 6-7, and a primary release lever 66. The release pawl 78 has a latch cam engaging surface 68 and is operatively coupled with the primary release lever 66. The release pawl 78 and primary release lever 66 are urged into contact with the latch 52 via pawl torsion spring 70. A distal end portion 72 of the primary release lever 66 is connected to a bowden primary hood release cable 74 that is in turn connected to the hood latch release lever inside the occupant compartment. A latch torsion spring 76 is provided about the pivot bolt 86 axis of the latch 52. The latch torsion spring 76 has an upper leg 80 and lower leg 82. The upper leg 80 is disposed adjacent the latch engagement stud 62, while the lower leg 82 is restrained in a lower notch 84 in the bracket 46. The latch torsion spring 76 thus urges the latch 52 into a counterclockwise rotation (as shown in FIGS. 5A-5C) about latch pivot bolt 86, urging the latch 52 to raise from the closed locked position to the release position and ultimately to the unlocked position.

The pawl torsion spring 70 is situated below the latch pivot bolt 86 about a pawl spring pivot bolt 88 and operates to urge the primary release lever 66 and the mechanically coupled pawl 78 into successive engagement with the primary and secondary latch tabs 64, 34 relative to the latch cam engaging surface 68 of the pawl 78. That is, in the closed locked position, the primary latch portion 54 engages and captures the striker 50 within the channel 58. The primary latch tab 64 of the latch 52 is engaged by the latch cam engaging surface 68, with both being urged into contact with one another. As the bowden cable 74 is actuated, the primary release lever 66 is rotated counterclockwise, as seen in FIG. 5A, causing the release pawl 78, also rotatably mounted about the pawl spring pivot bolt 72, to rotate in the counterclockwise direction as well, thereby removing the pawl 78 from engagement with the pawl engaging tab 64 of the latch 52.

Thus, urged by the latch torsion spring 76, the latch 52 likewise rotates in a counterclockwise direction to the first released position, shown in FIG. 5B. As the striker 50 is caught between the secondary latch portion 56 and the lower portion 60 within the channel 58, the striker 50 is likewise placed within the hood latch assembly 26 to a released position within the bracket 46. While in the release position just described, the striker 50 is nonetheless restrained by the secondary latch portion 56 such that it is unable to exit from the channel 58 and is thereby restrained by the latch 52 from any further travel by the latch cam engaging surface 68 abutting the secondary latch tab 34. However, as a consequence of having traveled upwards, the striker 50, along with the forward edge 38 of the hood 36, is raised approximately 35 to 40 mm above its original position. Of course, other assist mechanisms, such as gas cylinders, may be employed in addition to torsion springs. Moreover, any other mechanism known in the art may be utilized within the latch assembly 26 without departing from the teachings provided herein.

According to one embodiment, the motor vehicle operator then moves to the front of the motor vehicle 22 in close proximity to the hood 36 to search for and locate the secondary latch release handle 100 by inserting his or her fingers under the partially opened hood 36. To assist in locating the secondary latch release handle, a photoluminescent structure 10 is disposed on a portion thereof. The photoluminescent structure 10 is configured to illuminate when inputted light from the light source 30 is directed at the secondary latch. Once located, the motor vehicle operator actuates the secondary latch release handle 100 left or right, or up or down, depending on the design. As shown, the secondary latch release handle 100, typically a one-piece stamped component, has a substantially planar base portion 92 and a fixed, forwardly extending arm 94 and is rotatably mounted about a secondary release handle pivot bolt 96 and is displaced in a counterclockwise manner and further engages the pawl 78 to cause the latch cam engaging surface 68 to move away from the secondary latch tab 34 on the latch 52, thus releasing the latch 52 to further rotate counterclockwise, thereby causing the secondary latch portion 56 to no longer impede the upward portion of the striker 50. Further, with this rotation of the latch 52, the lower portion 60 of the latch 52 urges the striker 50 in an upward direction so that the striker 50 is free of the hood latch assembly 26. The hood 36 may be freely opened.

According to an alternate embodiment, the secondary latch release handle 100 is configured to extend forwardly of the vehicle 22. The hood 36 is held in the closed position by a hood latch striker 50 operably latched to the hood latch assembly 26. One end portion of the primary hood release cable 74 is attached to the primary release lever 66 and the other end portion is operably attached to the inside hood release lever in the passenger compartment (not shown). The hood latch assembly 26 has a secondary release handle 100, which when operated as described above, fully opens the hood 36. Also, as described above, a photoluminescent structure 10 may be disposed on a portion of the handle that luminesces in response to inputted light 142 emitted from the light source 30.

Figure 8:
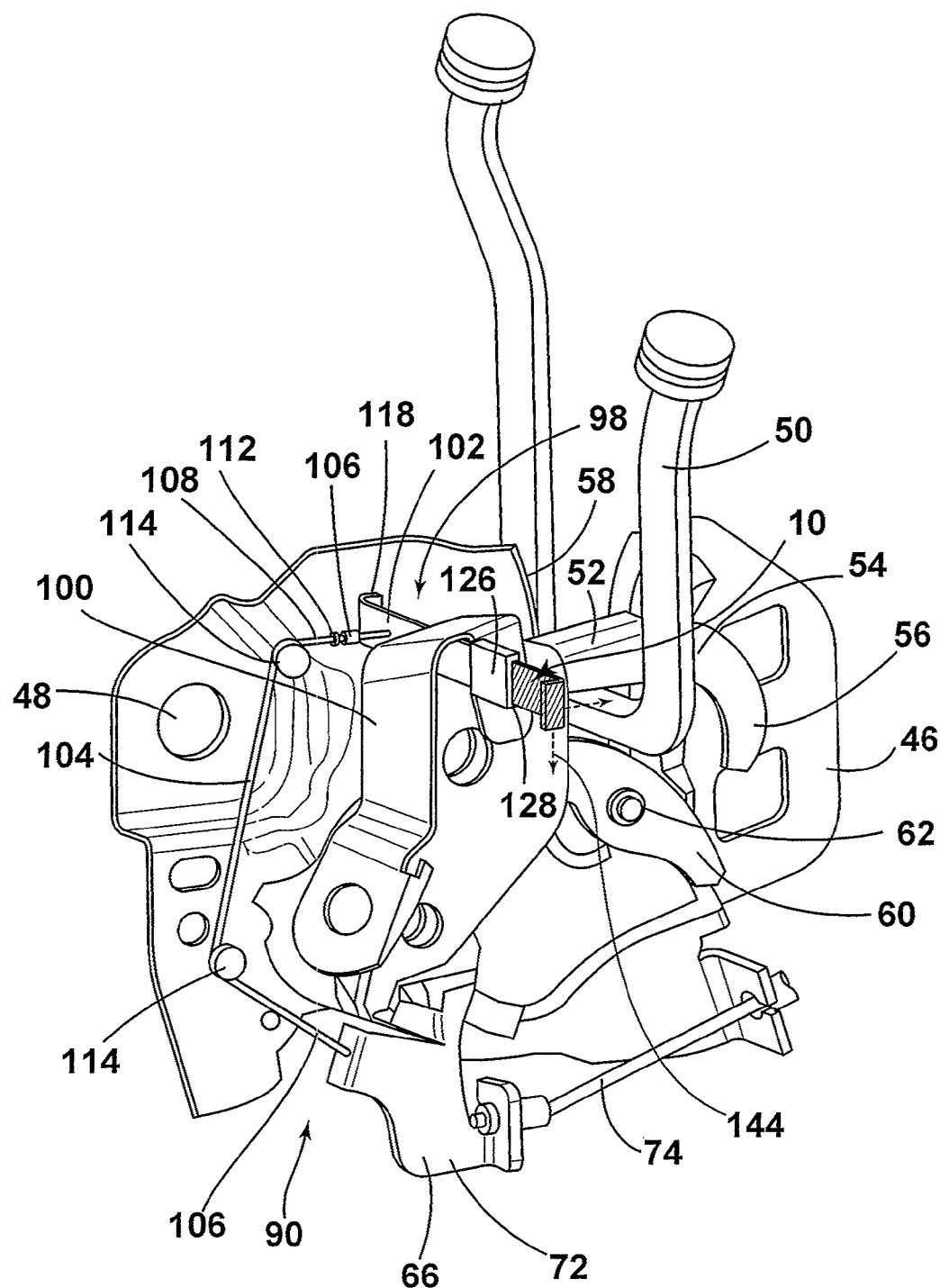
FIG. 8 is a front perspective view of the illuminated latch, according to an alternate embodiment, with the latch in the locked position.
Figure 9:
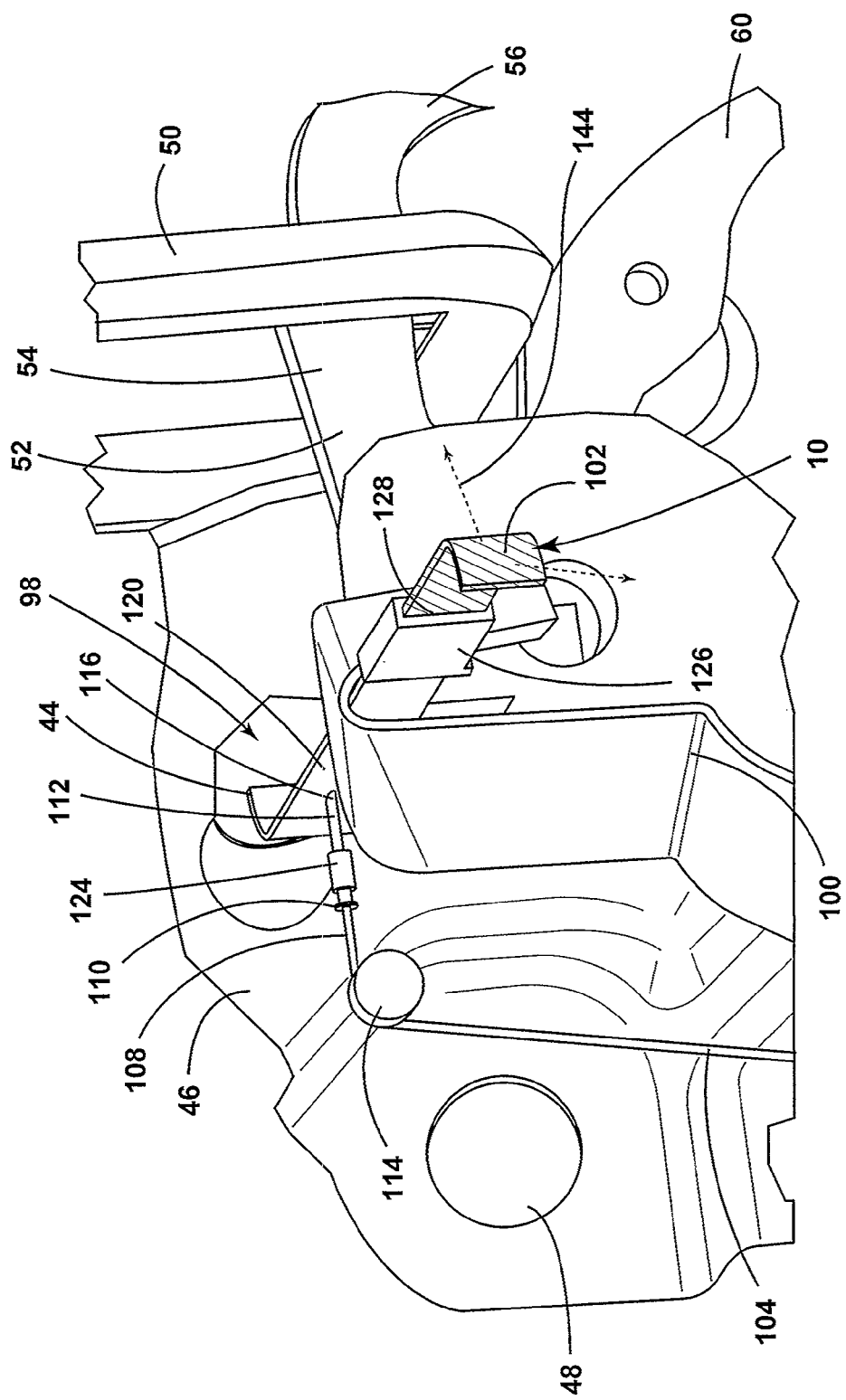
FIG. 9 is an enlarged front perspective view of the secondary latch release handle and secondary latch release handle arm in the with the secondary latch release handle arm in the retracted position.

As can be seen in FIGS. 8-9, the secondary latch release mechanism 98 includes a secondary latch release handle 100 having a deployable, secondary latch release handle arm 102 operatively coupled with a deployable handle release cable 104. A first end portion 106 of the deployable handle release cable 104 is securely attached to the primary release lever 66 of the hood latch assembly 26, and the other second end portion 108 is securely attached to a retainer 110, such as a spring-loaded pin 112. The retainer 110 may hold the deployable secondary latch release handle arm 102 in a first retracted position. Pulleys 114 may be provided as needed for routing the deployable handle release cable 104 about the hood latch assembly 26. As shown, a pair of pulleys 114 is provided.

The deployable secondary latch release handle arm 102 is thus retained by the spring-loaded pin 112 in the retracted position when the hood 36 is latched at the primary latch position shown in FIG. 5A. As can be seen in FIG. 11, the end portion 116 of the spring-loaded pin 112 is inserted into an opening 118, such as a hole or a slot, at a distal end portion 120 of the deployable secondary latch release handle arm 102. An inner circumference 122 of the opening 118 thus creates an engaging edge, and the sliding end portion 116 of the spring-loaded pin 112 thus creates an engaging surface resiliently urged against the engaging edge to releasably retain the deployable secondary latch release handle arm 102 in the retracted position. The opening 118 is somewhat larger than the outer diameter of the spring-loaded pin 112 in order to allow for manufacturing tolerances, so that the deployable secondary latch release handle arm 102 is consistently retained in a secure manner. The spring 124 for the spring-loaded pin 112 can be held securely in position by welding or fastening it to the latch mounting bracket 46.

As shown in FIG. 9, the deployable secondary latch release handle arm 102 is held in position by a deployable secondary latch release handle arm sleeve 126. The deployable secondary latch release handle arm sleeve 126 is securely attached (such as by welded, bonded, or fastened) to the base portion 92 of the secondary latch release handle 100. The deployable secondary latch release handle arm sleeve 126 also allows the deployable secondary latch release handle arm 102 to slide within its slot 128 from the retracted position, as shown in FIGS. 8-9, to a deployed position, and vice versa. The deployable secondary latch release handle arm 102 is held in this retracted state against the urging of a deployable secondary latch release handle arm spring 130. One end portion 136 of the deployable secondary latch release handle arm spring 130 is attached to the fixed deployable secondary latch release handle arm sleeve 126 and the other end portion 138 is attached to the distal end portion 120 of the deployable secondary latch release handle arm 102.

Referring to FIGS. 10-11, the deployable secondary latch release handle arm spring 130 is at an extended or energized state when the deployable secondary latch release handle arm 102 is in the retracted position, which in turns places a forward force on the deployable secondary latch release handle arm 102. This forward force on the deployable secondary latch release handle arm 102 is in turn resisted by the spring-loaded pin 112 and opening 118, which retain the deployable secondary latch release handle arm 102 in the retracted position by engagement of the spring-loaded pin 112 with the opening 118.

In operation, as the motor vehicle operator pulls on the passenger compartment hood release lever, the primary hood release cable 74 attached to the passenger compartment hood release lever pulls on the primary release lever 66, which in turn releases release pawl 78, which thereby releases the primary latch portion 54 to allow the striker 50 to engage the secondary latch 56 and which allows the motor vehicle operator to partially open the hood 36. The act of pulling of the primary hood release cable 74 by the motor vehicle operator and the pulling of the primary release lever 66 also simultaneously pulls the deployable handle release cable 104, due to its attachment to the primary release lever 66. This action of the deployable handle release cable 104 then pulls the spring-loaded pin 112 from engagement with the opening 118 (FIG. 11) on the deployable secondary latch release handle arm 102. The light source 30 that emits inputted light 142 may also become illuminated when an occupant pulls the hood release lever. It should be appreciated that the secondary latch release handle arm 102 may be extendable in any manner and is not limited to the linear actuation described above. For example, the secondary release handle 100 may be rotatably movable between retracted and deployed position.

Figures 12, 13:
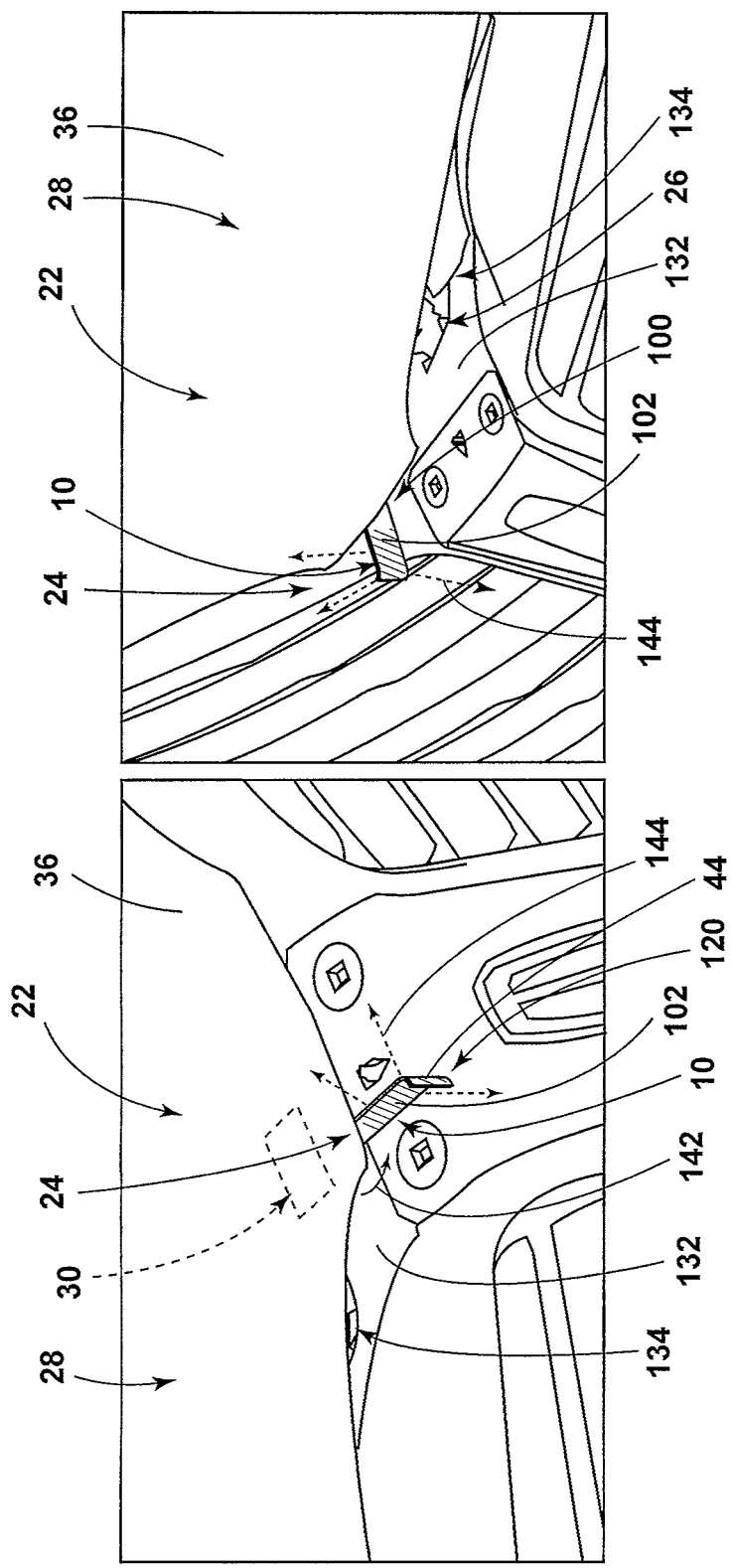
FIG. 12 is a first front side perspective view of the secondary latch release handle arm in the deployed position.
FIG. 13 is a second front side perspective view of the secondary latch release handle arm in the deployed position.

FIGS. 12 and 13 show the subsequent action of the deployment of the secondary release handle arm 102. As the spring-loaded pin 112 is pulled away and is disengaged from the opening 118 in the deployable secondary latch release handle arm 102, the deployable secondary latch release handle arm 102 then deploys forward by sliding within the slot 128 of the secondary deployable latch release handle sleeve 126 toward the outside of the motor vehicle 22 through the partial opening of the hood 36 due to the urging of the deployable secondary latch release handle arm spring 130. The deployable secondary latch release handle arm spring 130 then reverts back to its contracted and non-energized state, and the deployable secondary latch release handle arm 102 is thus presented to the motor vehicle operator outside and forward of the hood 36 in its deployed state. FIGS. 12 and 13 show a rendition of such deployment and the deployable secondary latch release handle arm 102 in its forward extended position. The motor vehicle operator may then actuate the deployable secondary latch release handle arm 102, along with the secondary latch release handle 100, to the left or right (or up or down, depending on the latch design) and fully open the hood 36. As illustrated, the light source 30 is illuminated and directs inputted light 142 towards the secondary latch release handle arm 102.

To close the hood 36, the motor vehicle operator may push the deployable secondary latch release handle arm 102 back to its retracted position. The distal end portion 120 of the deployable secondary latch release handle arm 102 may have a curved bent portion 44, and the end portion 116 of the spring-loaded pin 112 may be chamfered in such a way as to facilitate the sliding of the spring-loaded pin 112 along the length of the deployable secondary latch release handle arm 102 until the end portion 116 of the spring-loaded pin 112 re-engages the opening 118 in the deployable secondary latch release handle arm 102. The deployable secondary latch release handle arm 102 is then thus reset to its retracted position and energized for future deployment. The motor vehicle operator can now close the hood 36 using a normally accepted hood closing process.

The secondary latch release handle 100 disclosed herein thus automatically extends outside of the motor vehicle 22 through the partial opening of the hood 36 when the operator disengages the primary latch portion 54. The operator then simply actuates the deployable secondary latch release handle arm 102 left or right (or up or down per the latch design intent) and fully opens the hood 36. There is no need to kneel down, look for the handle under the hood 36 in darkness, or try to feel for it blindly and locate it by using one's fingers. It should be appreciated, however, that any other mechanism or configuration may be utilized for extending the hood latch past a front end portion of the hood 36 such that an occupant may easily locate the latch handle.

The illuminated latch system 24 described herein may further assist in locating the secondary latch release handle 100. The illuminated latch system 24 may include the light source 30 disposed on a surface 132 of a periphery 134 of the engine compartment 28 and a photoluminescent structure 10. The photoluminescent structure 10 contains at least one photoluminescent material 17, as described above, that is configured to luminesce in response to receiving inputted light 142. The photoluminescent material 17 is configured to convert inputted light 142 of a first wavelength to an outputted light 144 of a second wavelength. It should be appreciated, however, that the illuminated latch system 24 described herein may be used in conjunction with any closure mechanism disposed on a vehicle 22 including, but not limited to, closure mechanisms for the hood 36, a cover, a lid, or a door without departing from the teachings provided herein.

Figure 14:
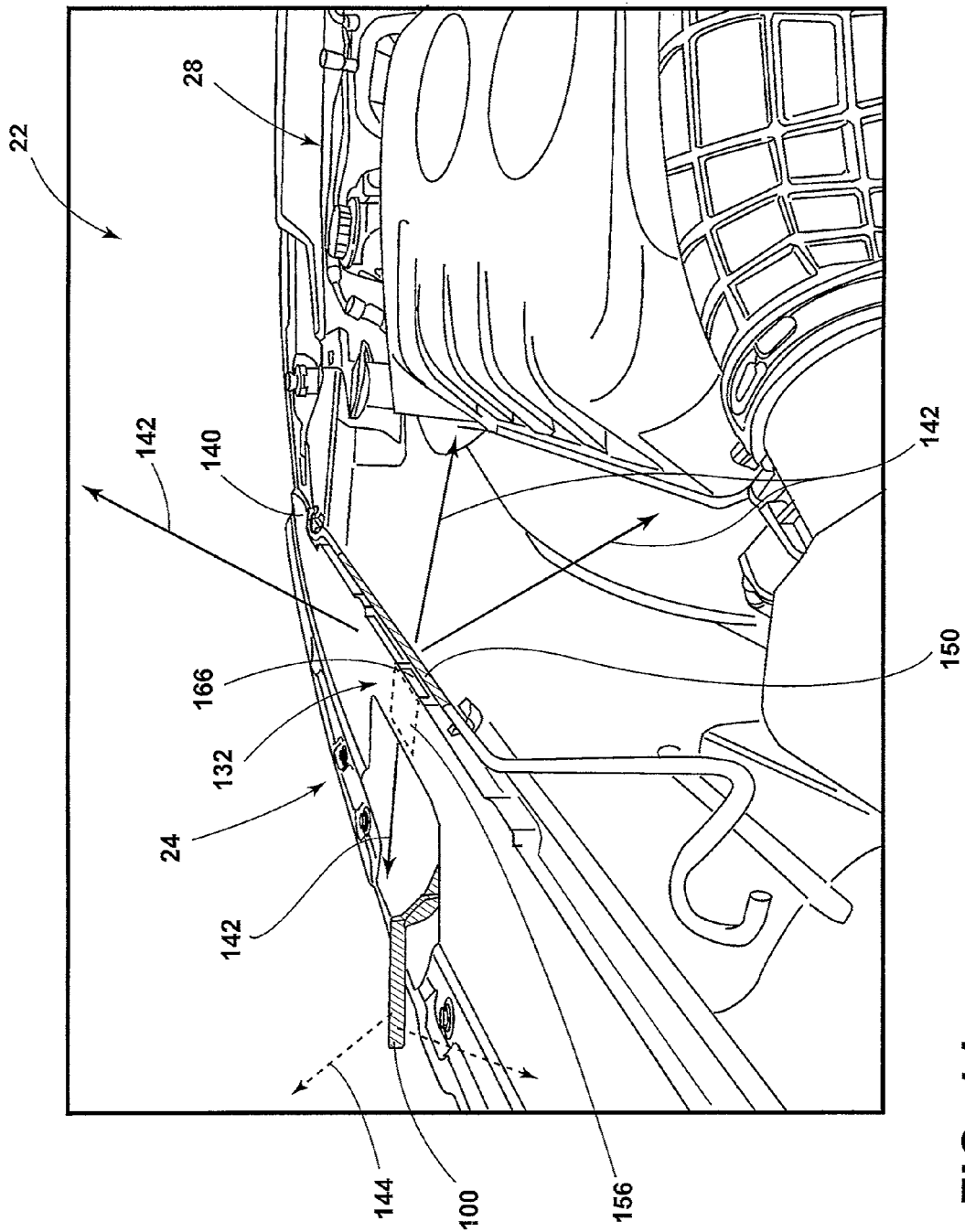
FIG. 14 is a perspective view of an engine compartment of the vehicle having a light source disposed on a front portion thereof.

Referring to FIG. 14, a perspective view of the vehicle 22 is shown demonstrating the illuminated latch system 24 configured to illuminate a portion of a vehicle engine compartment 28 and/or the secondary latch release handle 100. The light source 30 may be disposed on and/or within a structure of the vehicle 22, such as an engine compartment front trim component 140. The light source 30 may comprise any form of light source. For example fluorescent lighting, light emitting diodes (LEDs), organic LEDs (OLEDs), polymer LEDs (PLEDs), solid state lighting, or any other form of lighting configured to emit light may be utilized. As illustrated in FIG. 14, the light source 30 is disposed on the front trim component 140 and is oriented to emit inputted light 142 in a plurality of directions towards predefined locations, as will be described herein. For example, the light source 30 may be configured to emit inputted light 142 forwardly to illuminate the secondary latch release handle 100. Additionally, or alternatively, the light source 30 may be configured to emit light rearwardly towards the engine compartment 28.

Additionally, the light source 30 may include a light guide 156 and/or optics 166 configured to disperse or focus inputted light 142 being emitted therefrom to further illuminate the desired locations. For example, the light guide 156 may be utilized for directing a first portion of inputted light 142 emitted from the light source 30 towards the secondary latch release handle 100. A second portion of inputted light 142 emitted from the light source 30 may be directed towards a feature 150 on and/or within the engine compartment 28. It should be appreciated that the light source 30 may be located on any surface of the vehicle 22 and inputted light 142 emitted therefrom may be directed towards any desired feature 150 forwardly and/or within the engine compartment 28.

In operation, the light source 30 may be activated using a variety of means. For example, the illuminated latch system 24 may include a user interface 146 (FIG. 19) on and/or within the vehicle 22. The user interface 146 may be configured such that a user may control the wavelength of inputted light 142 that is emitted by the light source 30 and/or the portions of the light source 30 that are illuminated. Alternatively, the user interface 146 may be used to switch the illuminated latch system 24 through a plurality of modes and/or functions. The user interface 146 may use any type of control known in the art for control the light source 30, such as, but not limited to, switches (e.g., proximity sensors, push-type buttons) and may be disposed in any practicable location. Additionally, or alternatively, the light source 30 may be automatically activated when the primary latch 54 is released.

According to one embodiment, the light source 30 includes a flexible circuit board (e.g., a copper flexible circuit) that is coupled to, attached to, or disposed on the front trim component 140. In such an arrangement, the flexible circuit board may flex in conjunction with the front trim component 140. Alternatively, the light source 30 may be mounted on and/or within any vehicle panel and emit inputted light 142 through a portion thereof toward a desired location.

Figure 15:
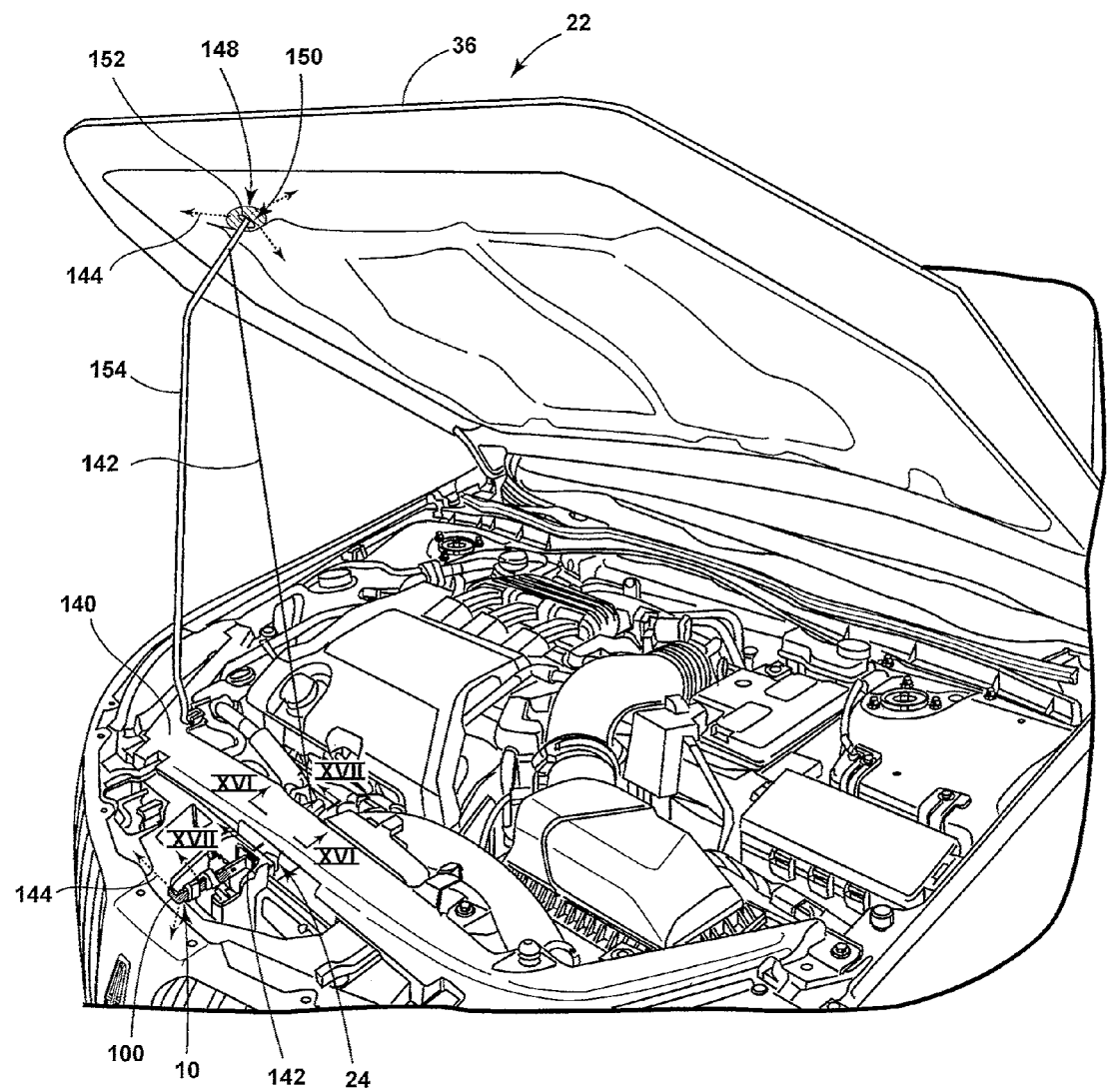
FIG. 15 is a perspective view of the engine compartment of the vehicle having a plurality of photoluminescent structures disposed proximately thereto.

Referring to FIG. 15, a photoluminescent structure 10 containing at least one photoluminescent material 17 is configured to illuminate in response to inputted light 142 emitted from the light source 30. More specifically, inputted light 142 emitted from the light source 30 towards the secondary latch release handle 100 may be converted by the photoluminescent structure 10 and re-emitted as outputted light 144 having a different wavelength, typically in the visible spectrum.

The photoluminescent material 17 is formulated to have an absorption spectrum that includes the emission wavelength of the inputted light 142 supplied from the light source 30. The photoluminescent material 17 is also formulated to have a Stokes shift resulting in the converted visible outputted light 144 having an emission spectrum expressed in a desired color, which may vary per lighting application. The converted visible light 144 is outputted from the secondary latch release handle 100 to illuminate in the desired color. In one embodiment, the energy conversion process is undertaken by way of down conversion, whereby the inputted light 142 includes light on the lower end of the visibility spectrum such as blue, violet, or ultraviolet (UV) light. Doing so enables blue, violet, or UV LEDs to be used as the light source 30, which may offer a relative cost advantage over simply using LEDs of the desired color and foregoing the energy conversion process altogether. Moreover, it is contemplated that blue LEDs may be utilized, which may run at a much higher intensity to compensate for dirt, snow, rain, etc. than white LEDs. Also, the utilization of blue LEDs may reduce rearward glare due to relative insensitivity of human eye to blue light so that the illuminated latch assembly 26 may brilliantly illuminate. Furthermore, the illumination provided by the illuminated latch assembly 26 may offer a unique, substantially uniform, and/or attractive viewing experience that may be difficult to duplicate through non-photoluminescent means.

In some embodiments, a plurality of photoluminescent structures 10, 148 may be disposed within the illuminated latch system 24. The light source 30 is configured to output a first wavelength of light 142. In response to receiving the light 142 at the first wavelength, any of the plurality of photoluminescent structures 10, 148 may become illuminated and emit light at least at a second wavelength 144, as described above. Additionally, each photoluminescent structure 10, 148 may illuminate in response to a different wavelength of light such that certain features 150 may be selectively illuminated. The plurality of photoluminescent structures 10, 148 may correspond to any number of features 150 proximate to the vehicle engine compartment 28. Additionally, any number of the photoluminescent structures 10, 148 may be disposed on and/or in surfaces proximate the light source 30, such as on the interior surface of the hood 36 of the vehicle 22.

In the illustrated embodiment, the illuminated latch system 24 includes a first photoluminescent structure 10 disposed on the secondary latch release handle 100 and a second photoluminescent structure 148 disposed on a portion of an interior surface of the hood 36. The second photoluminescent structure 148 may correlate to an insertion opening 152 for a prop rod 154 that is configured to maintain an open position of the hood 36 above the engine compartment 28.

Each of the plurality of photoluminescent structures 10, 148 may incorporate one or more photoluminescent material (s) 17 configured to emit a specific color light in response to the excitation generated in response to the inputted light 142 emitted from the light source 30. In some embodiments, a combination of photoluminescent material(s) 17 may be utilized in the photoluminescent structures 10, 148 to output various wavelengths corresponding to different colors of light. The illuminated latch system 24 may provide various benefits including a cost-effective method for illuminating an engine compartment 28 and incorporating ambient lighting to at least one feature 150 proximate the engine compartment 28.

Figure 16:
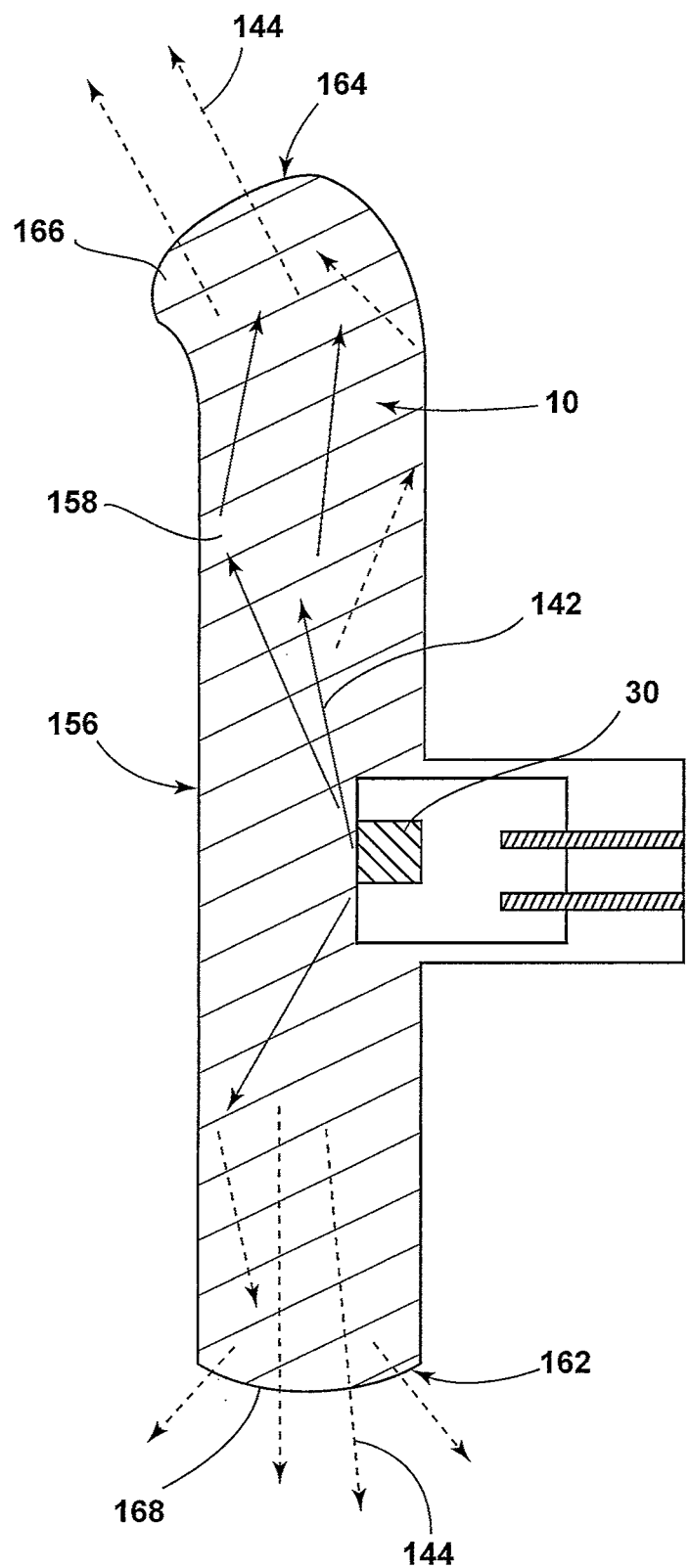
FIG. 16 is a cross-sectional view of a light guide taken along the line XVI-XVI of FIG. 15 illustrating a light pipe and light source configured to emit light towards a plurality of desired features.

Referring to FIG. 16, a cross section of the light guide 156 taken along the line XVI-XVI of FIG. 15 is illustrated. As shown, the illuminated latch system 24 may include a light guide 156 according to one embodiment. As shown in FIG. 16, the light guide 156 includes an optical grade light pipe 158 which is a substantially transparent or translucent pipe suitable for transmitting light as emitted from the light source 30. The light pipe 158 may be formed from a rigid material that is comprised of a curable substrate such as a polymerizable compound, a mold in clear (MIC) material or mixtures thereof. Acrylates are also commonly used for forming rigid light pipes, as well as polymethyl methacrylate (PMMA) which is a known substitute for glass. A polycarbonate material may also be used in an injection molding process to form the rigid light pipe 158. Further, the light pipe 158 may be a flexible light pipe 158, wherein a suitable flexible material is used to create the light pipe 158. Such flexible materials include urethanes, silicone, thermoplastic polyurethane (TPU), or other like optical grade flexible materials. Whether the light pipe 158 is flexible or rigid, the light pipe 158, when formed, is substantially optically transparent and/or translucent and capable of transmitting light. The light pipe 158 may be referred to as a light guide, a light plate, a light bar or any other light carrying substrate made from a clear or substantially translucent plastic.

According to one embodiment, a photoluminescent structure 10 may be disposed within the light pipe 158. Accordingly, inputted light 142 emitted from the light source 30 may be converted from a first, inputted wavelength 142 to a second, outputted wavelength 144 as the light travels through the light pipe 158. The outputted light 144 may be directed towards features 150 (FIG. 15) of the vehicle 22, such as the secondary latch release handle 100.

The light pipe 158 may have a linear structure, or may be curved to direct light in any desired direction. As illustrated, a first end portion 162 of the light pipe 158 maintains a linear orientation thereby directing light in a first desired direction. The opposing end portion 164 of the light pipe 158 has a curved orientation such that outputted light 144 may be directed in a direction that is offset from the opposing end portion 164. Either end portion 162, 164 of the light pipe 158 may further include optics 166 such that light may further be directed toward a desired feature 150 proximate the light guide 156.

Figure 17:
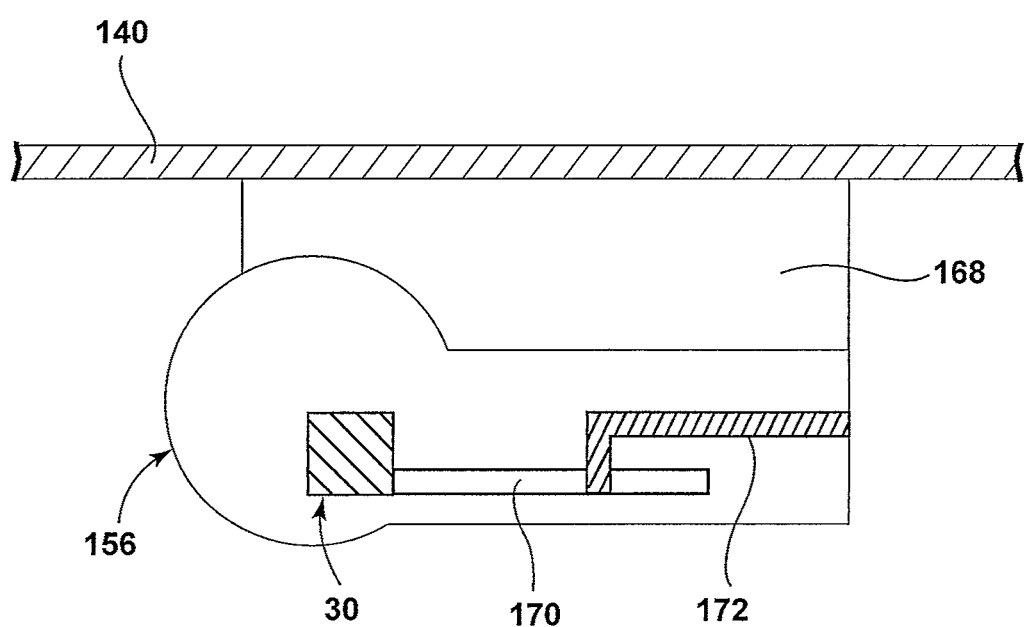
FIG. 17 is a cross-sectional view of the light guide taken along the line XVII-XVII of FIG. 15 illustrating the light guide attached to a portion of the engine compartment.

Referring to FIG. 17, a cross section taken along the line XVII-XVII of FIG. 15 is illustrated. As illustrated, the light guide 156 is attached to a bottom surface of the front trim component 140. Known methods of attaching the light guide 156 to the front trim component 140 involves the bonding of a preformed light pipe 158 to a preformed carrier trim by adhesion, such as by using a double-sided tape, or by mechanical connections such as brackets 168 that are formed into the carrier substrate.

Alternatively, the front trim component 140 and light guide 156 may be integrally formed through a multi-shot molding process. Due to fabrication and assembly steps being performed inside the molds, molded multi-material objects allow significant reduction in assembly operations and production cycle times. Furthermore, the product quality can be improved, and the possibility of manufacturing defects, and total manufacturing costs can be reduced. In multi-material injection molding, multiple different materials are injected into a multi-stage mold. The sections of the mold that are not to be filled during a molding stage are temporally blocked. After the first injected material sets, then one or more blocked portions of the mold are opened and the next material is injected. This process continues until the multi-material part is created.

According to one embodiment, a multi-shot molding process is used to create portions of the light guide 156, which may be integrally formed with the light source 30. Additional optics 166 (FIG. 16) may also be molded into the light pipe 158 during the multi-material injection molding process. Initially, the front trim component 140 is formed through a first injection molding step. A light pipe 158 is then molded and coupled to the front trim component 140 in a second injection molding step. Lastly, a light source 30, a Printed Circuit Board (PCB) 170, conductive leads 172, and/or a heat sink is placed into the mold and thereby proximately disposed to the front trim component 140 and light guide 156 through injection molding or any other known attachment method, such as vibration welding. Integrally forming portions of the light guide 156, while encapsulating the light source 30, PCB 170, and portions of the conductive leads 172, may protect the light guide 156 from physical and chemical damage arising from environmental exposure.

In alternative embodiments, additional components may be added during one of the injection steps, or successively added in additional injections to adhere more components to the light guide 156. In some embodiments, the light pipe 158 may have a photoluminescent material 17 applied to it.

Figure 18:
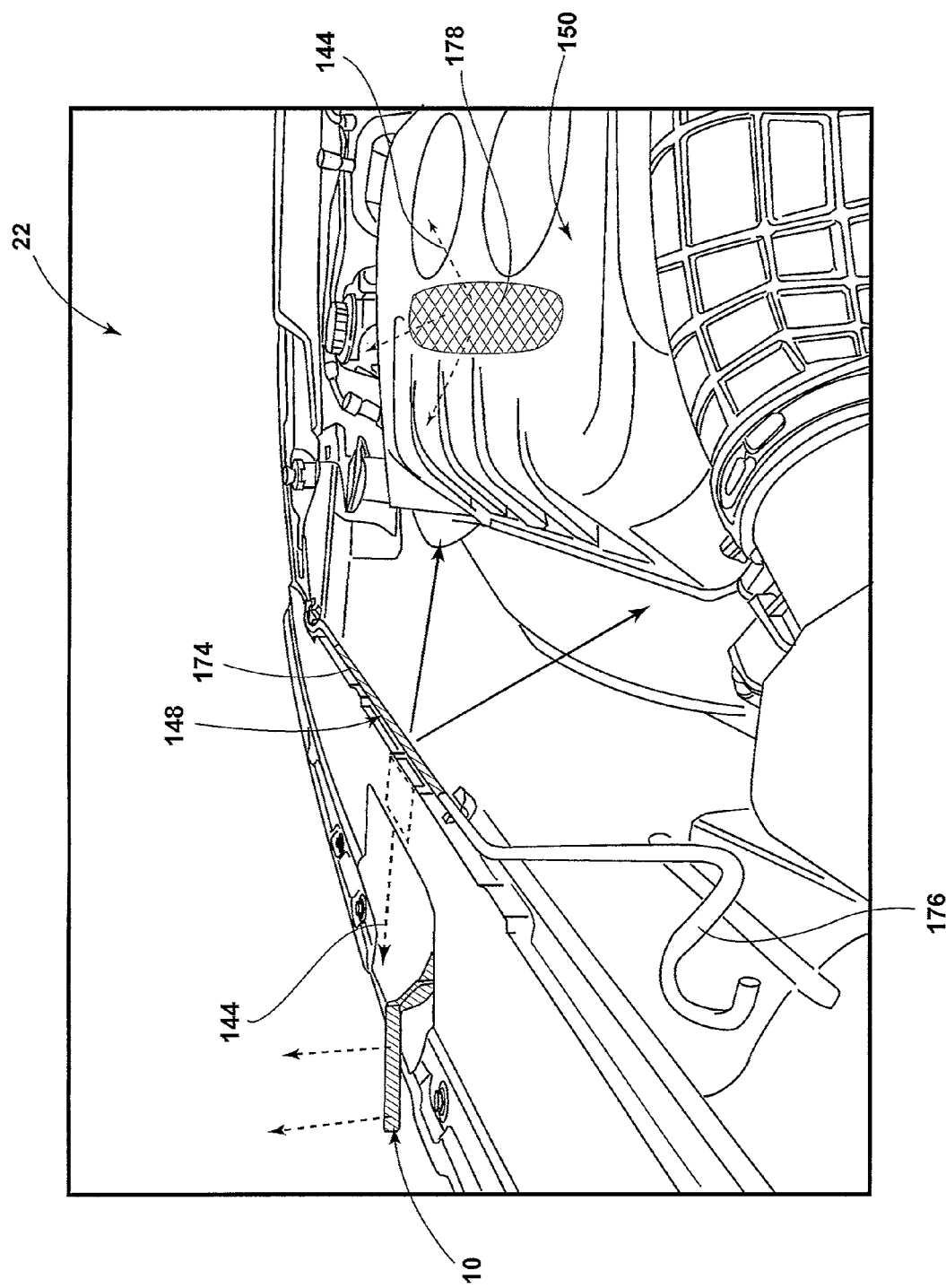
FIG. 18 is a perspective view of the engine compartment of the vehicle having a plurality of features with photoluminescent structures therein.

Referring to FIG. 18, the illuminated latch system 24 is shown according to one embodiment. As illustrated, the light pipe 158 is configured to direct a first portion of light towards the secondary latch release handle 100. A second portion of light is directed in an opposing direction, towards the engine compartment 28.

As illustrated in FIG. 18, a first photoluminescent structure 10 may be disposed on the light guide 156 such that inputted light 142 emitted from the light source 30 may be converted by the first photoluminescent structure 10 to outputted light 144. The outputted light is directed towards the secondary latch release handle 100. The prop rod 154 may include a second photoluminescent structure 148 thereon. According to one embodiment, a sleeve member 174 is disposed around a portion of the prop rod 154 containing the second photoluminescent structure 148 therein and/or thereon. The second photoluminescent structure 148, disposed on the sleeve member 174, may direct an occupant's attention to the prop rod 154 when the prop rod 154 is in a first, latched down position. When the prop rod 154 is unlatched, inputted light 142 may be directed from the light guide 156 towards the insertion opening 152 in the hood 36 and/or lettering on an interior surface of the hood 36 thereby illuminating both to call occupant attention to the appropriate location for disposition of the prop rod 154. It should be appreciated that an end portion 176 of the prop rod 154 may also have a photoluminescent structure 10 thereon such that the end portion 176 illuminates when the prop rod 154 is moving from the first position to the second position.

A third photoluminescent structure 178 may be disposed on and/or within a feature 150 of the vehicle 22. The third photoluminescent structure 178 may illuminate a desired feature 150 within the engine compartment 28 or indicia disposed on a component within the engine compartment 28 to provide an aesthetic appearance, or may provide vehicle information to an intended observer.

Figure 19:
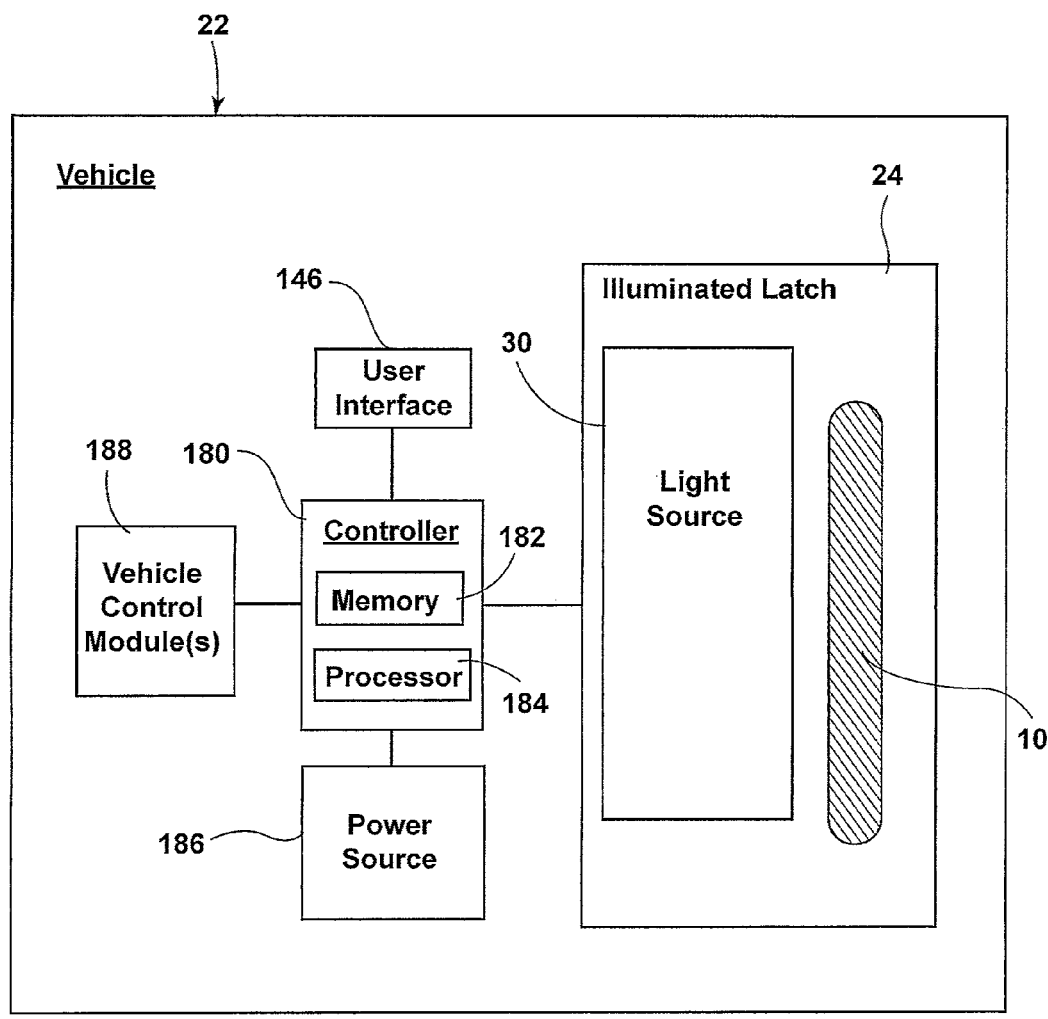
FIG. 19 is a block diagram of the vehicle having the illuminated latch system employed therein.

Referring to FIG. 19, a block diagram of a vehicle 22 is generally shown in which the illuminated latch system 24 is implemented. The illuminated latch system 24 includes a controller 180 in communication with the light source 30. The controller 180 may include memory 182 having instructions contained therein that are executed by a processor 184 of the controller 180. The controller 180 may provide electrical power to the light source 30 via a power source 186 located onboard the vehicle 22. In addition, the controller 180 may be configured to control the inputted light 142 emitted from each light source 30 based on feedback received from one or more vehicle control modules 188 such as, but not limited to, a body control module, engine control module, steering control module, brake control module, the like, or a combination thereof. By controlling the inputted light 142 emitted from the light source 30, the illuminated latch system 24 may illuminate in a variety of colors and/or patterns to provide an aesthetic appearance, or may provide vehicle information to an intended observer. For example, when the illuminated latch system 24 is illuminated, the illuminated latch system 24 may illuminate the secondary latch release handle 100.

In operation, the photoluminescent structure 10 may exhibit periodic unicolor or multicolor illumination. For example, the controller 180 may prompt the light source 30 to periodically emit only the first wavelength of inputted light 142 to cause the photoluminescent structure 10 to periodically illuminate in the first color. Alternatively, the controller 180 may prompt the light source 30 to periodically emit only the second wavelength of inputted light 142 to cause the photoluminescent structure 10 to periodically illuminate in the second color.

Alternatively, the controller 180 may prompt the light source 30 to simultaneously and periodically emit the first and second wavelengths of inputted light 142 to cause the photoluminescent structure 10 to periodically illuminate in a third color defined by an additive light mixture of the first and second colors. Alternatively still, the controller 180 may prompt the light source 30 to alternate between periodically emitting the first and second wavelengths of inputted light 142 to cause the photoluminescent structure 10 to periodically illuminate by alternating between the first and second colors. The controller 180 may prompt the light source 30 to periodically emit the first and/or second wavelengths of inputted light 142 at a regular time interval and/or an irregular time interval.

In another embodiment, the illuminated latch system 24 may include a user interface 146. The user interface 146 may be configured such that a user may control the wavelength of inputted light 142 that is emitted by the light source 30. Such a configuration may allow a user to control which features 150 (FIG. 15) are illuminated.

With respect to the above examples, the controller 180 may modify the intensity of the emitted first and second wavelengths of inputted light 142 by pulse-width modulation or current control. In some embodiments, the controller 180 may be configured to adjust a color of the emitted light by sending control signals to adjust an intensity or energy output level of the light source 30. For example, if the light source 30 is configured to output the first wavelength at a low level, substantially all of the first wavelength may be converted to the second wavelength. In this configuration, a color of light corresponding to the second wavelength may correspond to the color of the emitted light from the illuminated latch system 24. If the light source 30 is configured to output the first wavelength at a high level, only a portion of the first wavelength may be converted to the second wavelength. In this configuration, a color of light corresponding to mixture of the first wavelength and the second wavelength may be output as the emitted light. In this way, each of the controllers 180 may control an output color of the emitted light.

Though a low level and a high level of intensity are discussed in reference to the first wavelength of inputted light 142, it shall be understood that the intensity of the first wavelength of inputted light 142 may be varied among a variety of intensity levels to adjust a hue of the color corresponding to the emitted light from the illuminated latch system 24. The variance in intensity may be manually altered, or automatically varied by the controller 180 based on pre-defined conditions. According to one embodiment, a first intensity may be output from the illuminated latch system 24 when a light sensor senses daylight conditions. A second intensity may be output from the illuminated latch system 24 when the light sensor determines the vehicle 22 is operating in a low light environment.

As described herein, the color of the outputted light 144 may be significantly dependent on the particular photoluminescent materials 17 utilized in the photoluminescent structure 10. Additionally, a conversion capacity of the photoluminescent structure 10 may be significantly dependent on a concentration of the photoluminescent material 17 utilized in the photoluminescent structure 10. By adjusting the range of intensities that may be output from the light source 30, the concentration, types, and proportions of the photoluminescent materials 17 in the photoluminescent structure 10 discussed herein may be operable to generate a range of color hues of the emitted light by blending the first wavelength with the second wavelength.

Accordingly, an illuminated latch system configured as an illuminated latch for a vehicle that is configured to illuminate a portion thereof has been advantageously provided herein. The illuminated latch retains its structural properties while providing photoluminescent light having both functional and decorative characteristics.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle comprising:
   an engine compartment having a latch configured to open the compartment;
   a light source configured to emit light at a first wavelength disposed between the compartment and the latch;
   a light guide optically coupled to the light source and configured to direct light towards the latch and the compartment; and
   a first photoluminescent structure disposed within the light guide and a second photoluminescent structure disposed within the compartment, wherein each photoluminescent structure is configured to luminesce in response to excitation by the light source.

2. The vehicle of claim 1, wherein the light source is integrally disposed within the light guide.

3. The vehicle of claim 2, wherein the light source and light guide are coupled to a bottom surface of a trim component disposed between a front portion of the vehicle and the engine compartment.

4. The vehicle of claim 1, wherein the light source is disposed proximately to a forward portion of an engine compartment.

5. The vehicle of claim 1, further comprising:
optics disposed at one end portion of the light guide and configured to direct light towards the second photoluminescent structure.

6. The vehicle of claim 1, further comprising:
a prop rod disposed within the engine compartment and configured to hold a hood in an open position, wherein a third photoluminescent structure is disposed on a portion of the prop rod.

7. The vehicle of claim 6, wherein the second photoluminescent structure encompasses an insertion opening in a hood to provide assistance in disposing the prop rod therein.

8. An illuminated latch system for a vehicle, comprising:
a light source of the latch system attached to a component proximate an engine compartment and optically coupled to a light guide configured to transmit inputted light from the light source; and
a first photoluminescent structure configured to emit outputted light in response to light emitted from the light source, wherein the light guide directs light towards the first photoluminescent structure.

9. The illuminated latch system for a vehicle of claim 8, wherein the component is a trim component disposed proximately to a front end portion of an engine compartment.

10. The illuminated latch system for a vehicle of claim 8, wherein the light guide is configured to direct light towards a secondary latch release handle.

11. The illuminated latch system for a vehicle of claim 8, wherein the first photoluminescent structure is disposed within the light guide and is configured to convert light from a first wavelength to a second wavelength.

12. The illuminated latch system for a vehicle of claim 10, wherein the light source emits an inputted light of a first wavelength into a light pipe and the light pipe emits an outputted light at a second wavelength towards the latch.

13. The illuminated latch system for a vehicle of claim 8, wherein the first photoluminescent structure includes at least one photoluminescent material configured to down convert an inputted light received from at least a portion of the light source into a visible light.

14. The illuminated latch system for a vehicle of claim 8, wherein the inputted light is one of a blue light, violet light, and a UV light.

15. An illuminated latch system for a vehicle, comprising:
a light source of the latch system;
a light pipe operably coupled with the light source; and
a first photoluminescent structure disposed within the light pipe, wherein inputted light emitted from the light source is converted to a second wavelength within the light pipe and directed towards a feature on a vehicle engine compartment.

16. The illuminated latch system for a vehicle of claim 15, wherein light emitted from the source is one of a blue light, violet light, and a UV light.

17. The illuminated latch system for a vehicle of claim 15, further comprising:
a second photoluminescent structure disposed on a feature within an engine compartment to receive light from the light source via the light pipe.

18. The illuminated latch system for a vehicle of claim 17, wherein the first photoluminescent structure illuminates in a first color and the second photoluminescent structure illuminates in a second color.

19. The illuminated latch system for a vehicle of claim 15, further comprising:
a second photoluminescent structure disposed on a secondary latch release handle that is configured to illuminate when a primary latch release handle is disposed in an open position.

20. The illuminated latch system for a vehicle of claim 19, wherein the secondary latch release handle includes an extendable handle and the second photoluminescent structure is configured to illuminate a portion of the extendable handle.

* * * * *